July 8, 1969  C. S. L. REES  3,454,187

CONTAINERS

Filed April 15, 1968

INVENTOR
CHARLES SYDNEY LOVELESS REES
BY
ATTORNEYS

United States Patent Office 3,454,187
Patented July 8, 1969

3,454,187
CONTAINERS
Charles Sydney Loveless Rees, c/o M.B.P. Design and Test Limited, Burrell Road, Haywards Heath, Sussex, England
Filed Apr. 15, 1968, Ser. No. 721,462
Claims priority, application Great Britain, July 21, 1967, 33,604/67
Int. Cl. B65d 7/44; A45c 13/36
U.S. Cl. 220—73
4 Claims

ABSTRACT OF THE DISCLOSURE

A container of synthetic resin-bonded fibrous material having its edges reinforced by metal strips of corner-section having a re-entrant angle into which the resin-bonded fibrous material extends is provided with a length of material, capable of forming a strong bond with the resin, extending parallel to and for substantially the length of each between adjacent layers of fibrous material within the re-entrant angle.

---

This invention relates to containers and more particularly to containers made of synthetic resin-bonded fibrous material such as fibre glass or other materials such as hessian, linen and similar woven materials.

It is frequently required to provide such containers with reinforced outer edges of metal, for example, of aluminium. This can be simply effected by forming the edges from metal strip of substantially corner-section having a re-entrant angle, the resin-bonded fibre glass or similar material being forced into the interior of the re-entrant angle of the corner-section during the manufacture of the container, in order to key the metal strip to the wall panels of the container. If desired, additional keying can be obtained by the provision of longitudinal fins extending from the strip into the walls of the container.

It has been found, however, that such containers do not stand up to rough handling in use since the adhesion of the metal to the resin used to bond the fibre glass (usually a polyester resin) is poor, so that if the container is dropped on an edge from two or three feet, the reinforcing metal strip frequently becomes loose.

It is an object of the present invention to provide a container of synthetic resin-bonded fibrous material having metal reinforced outer edges, which can withstand rough treatment and in particular can be dropped from heights of at least up to ten feet without loosening of the metal reinforcements.

According to the invention, there is provided a container made of synthetic resin-bonded fibrous material and having its outer edges reinforced by metal strips of corner-section having a re-entrant angle, wherein the resin-bonded fibrous material extends into the re-entrant angle of the corner-section to at least assist in the keying of the strips to the container, and wherein each of the metal strips is provided with a length of a material capable of forming a strong bond with the resin serving to bond the fibrous material extending parallel to and for substantially the length of the strip between adjacent layers of the fibrous material within the re-entrant angle. The preferred material is wood since this has been found to form a strong bond with the polyester resins normally used to bond the fibrous material.

The preferred material of construction of the container is polyester resin bonded fibre glass and for the metal strips, aluminium.

Figure 1:
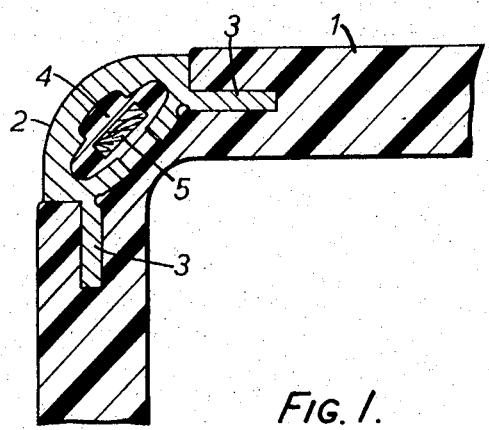
Figure 2:
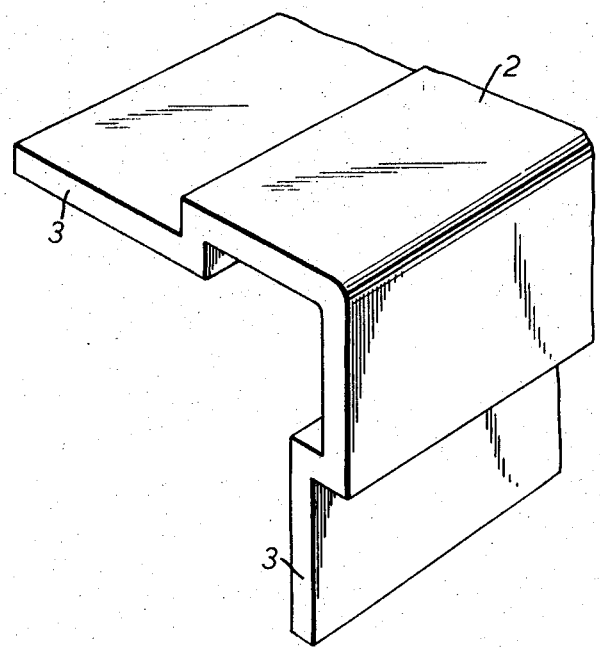

The invention will now be further described with reference to the accompanying drawing, in which:

FIGURE 1 is a sectional view through one edge of a container according to the invention; and FIGURE 2 is a perspective view of part of an alternative form of edge strip for use in a container according to the invention.

Referring to FIGURE 1, the container 1 is made of polyester resin-bonded layers of fibrous material and is reinforced at each outer edge by an aluminium strip 2. The strip 2 has a corner-shaped section and is provided with two longitudinal fins 3 projecting into the walls of the container 1. In order to key the strip 2 to the container, the resin-bonded fibrous material is forced during manufacture of the container into the interior 4 of the corner-section, additional keying being provided by the fins 3.

In accordance with the invention, a length 5 of wood is inserted between two adjacent layers of fibrous material within the corner-section. The length 5 is of substantially the same length as the metal strip 2 and extends parallel to the strip. The length 5 can readily be inserted during manufacture of the container before the resin has hardened.

It is found that a container so constructed can be dropped repeatedly from the height of up to ten feet without separation of the metal edge reinforcements.

While the dimensions of the length of wood 5 are not critical provided that it can be inserted between the layers of fibrous material in the corner-section, for a corner-section having an internal length of ⅝", an internal width of about ¼" and an opening of about ³⁄₁₆", a length of wood approximately ¼" wide and ⅛" thick has been found to be very suitable.

Other materials may be used in place of wood, provided that they are capable of forming a strong bond with the resin used to bond the fibrous material.

The corners of the container will be protected in the usual manner by suitably shaped metal reinforcing corner pieces preferably of aluminium.

An alternative form of corner-section metal strips which can be used in the invention as shown in FIGURE 2 of the drawings.

What I claim as my invention and desire to secure by Letters Patent of the United States is:

1. A container made of synthetic resin-bonded fibrous material and having its corner edges reinforced by metal strips of a corner-section having a re-entrant angle, wherein the resin bonded fibrous material extends into the re-entrant angles of the corner-sections to at least assist in the keying of the strips to the container, and wherein each of said metal strips is provided with a length of a material capable of forming a strong bond with the resin serving to key the fibrous material within the corner section, said length of material extending parallel to and for substantially the length of the corner section between adjacent layers of said fibrous material within the re-entrant angle.

2. A container as claimed in claim 1, wherein said synthetic resin-bonded fibrous material is polyester resin-bonded fibre glass.

3. A container as claimed in claim 1 wherein said metal strips are of aluminium.

4. A container as claimed in claim 1, wherein said length of material capable of forming a strong bond with the resin-bonded fibrous material is wood.

References Cited

UNITED STATES PATENTS 3,182,847   5/1965   Fuller _____ 220—80 X

FOREIGN PATENTS 895,462   5/1962   Great Britain.
1,065,942   4/1967   Great Britain.

JOSEPH R. LECLAIR, *Primary Examiner.*

JAMES R. GARRETT, *Assistant Examiner.*

U.S. Cl. X.R.

190—37